Aug. 31, 1954 A. TALALAY ET AL 2,687,979
METHOD OF MAKING CUSHIONING BODIES
Filed June 8, 1953 2 Sheets-Sheet 1
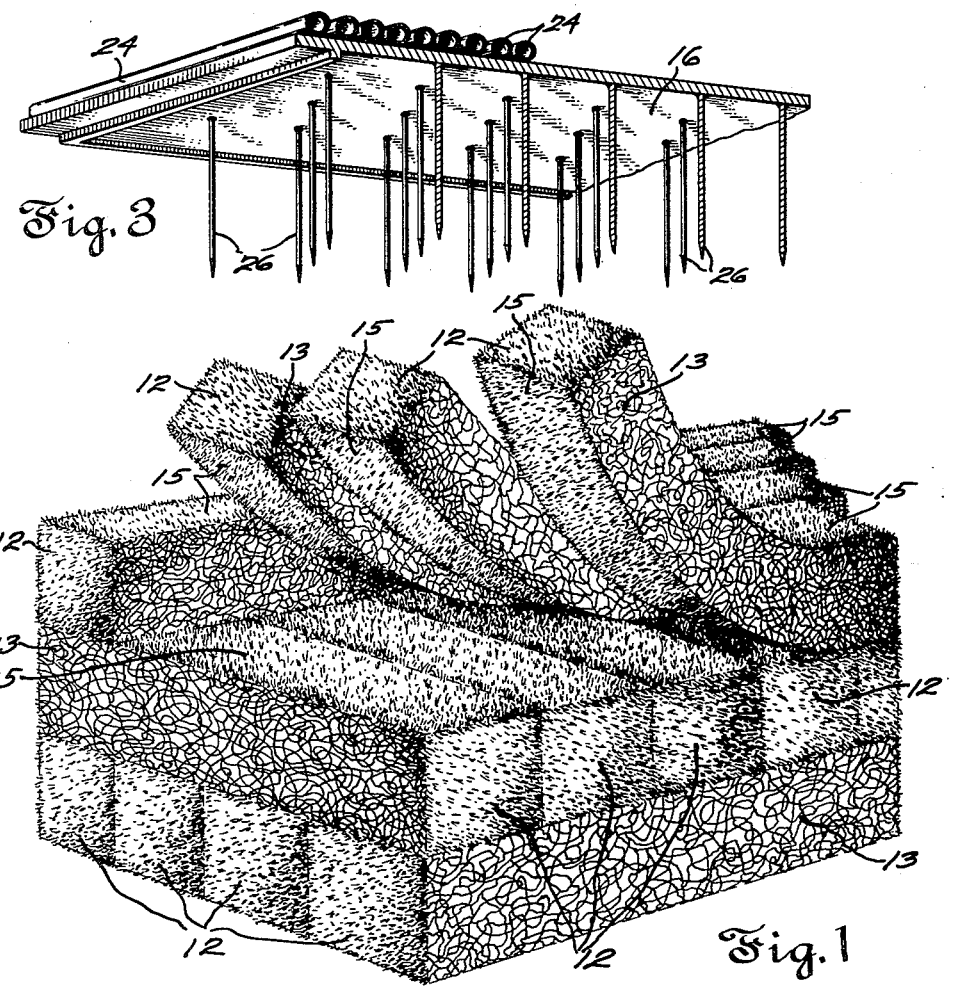
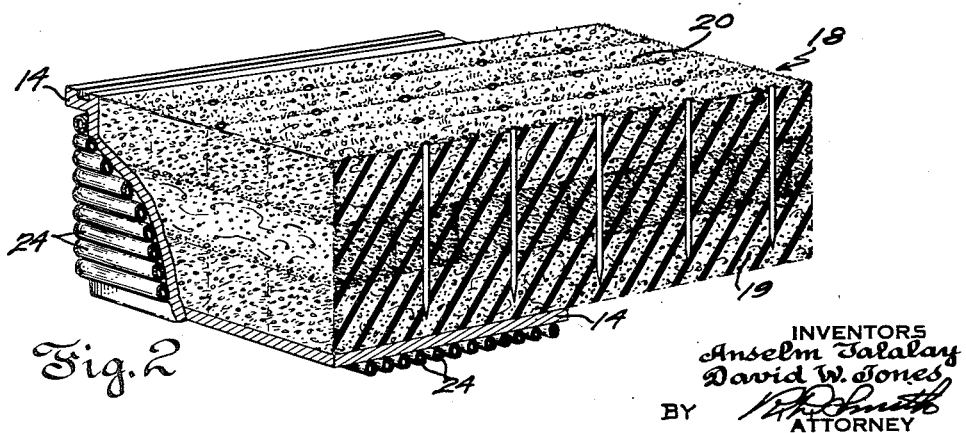
INVENTORS
Anselm Talalay
David W. Jones
BY
ATTORNEY

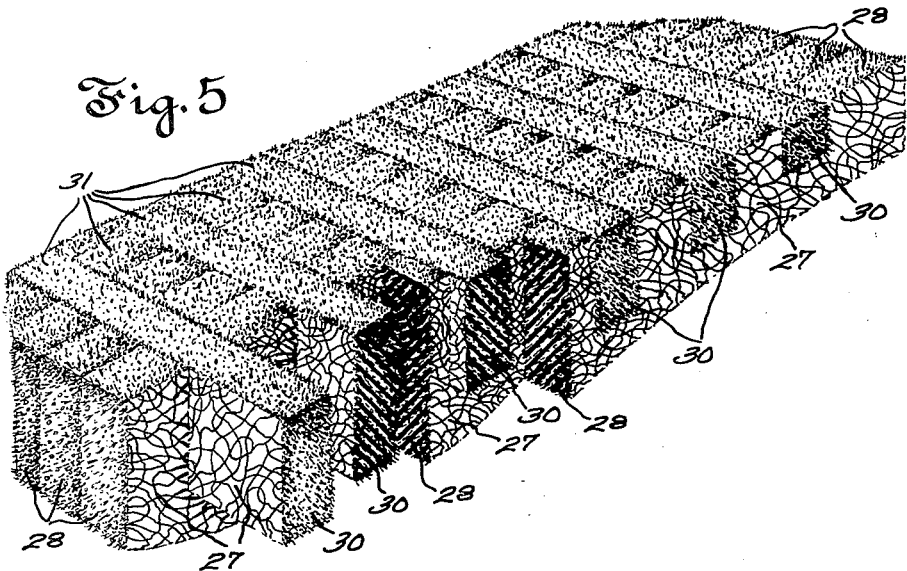
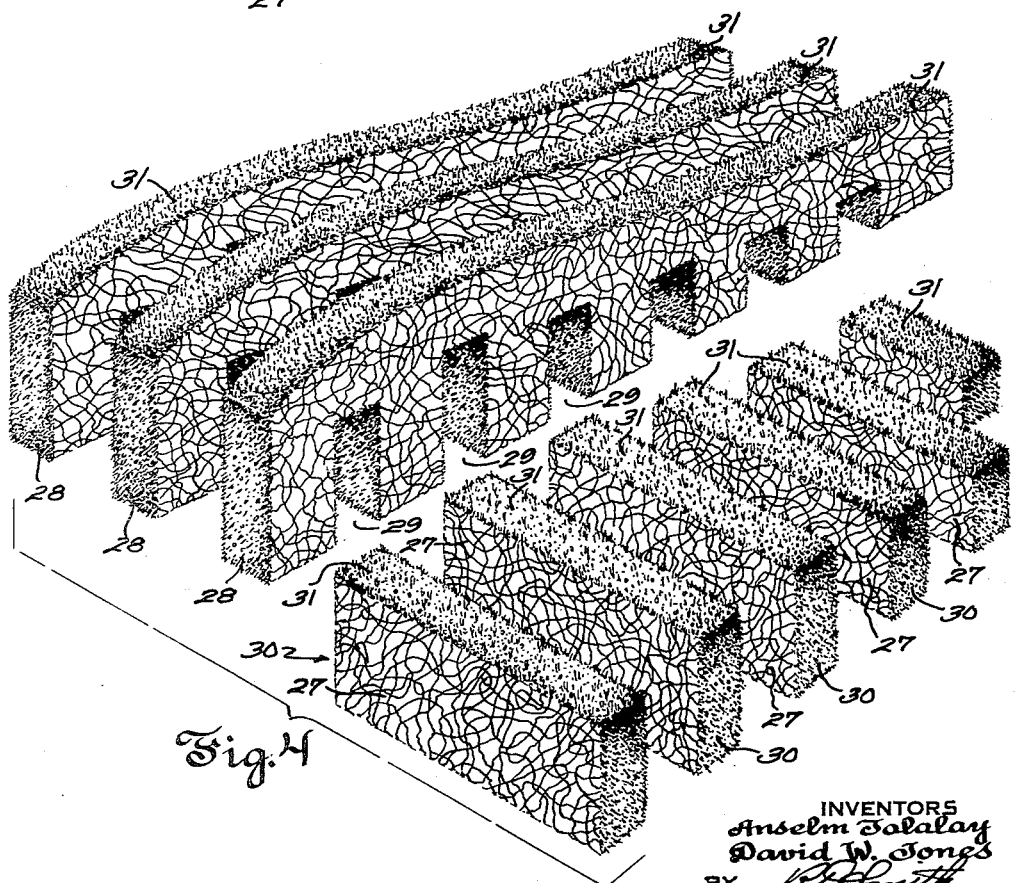

UNITED STATES PATENT OFFICE 2,687,979

METHOD OF MAKING CUSHIONING BODIES

Anselm Talalay, New Haven, and David W. Jones, Shelton, Conn., assignors to The Sponge Rubber Products Company, Shelton, Conn., a corporation of Connecticut Application June 8, 1953, Serial No. 360,043

5 Claims. (Cl. 154—101)

This invention relates to methods of making resilient cushioning bodies of long range elasticity and of very light weight, particularly with a content of foamed latex sponge.

More specifically the invention relates to ways of producing what may be called an improved "combination" material comprising foam rubber reinforced in a more effective manner than heretofore by a fibrous or filamentous content.

Examples of such improved combination material and its advantages are set forth and claimed in our co-pending application for patent, Serial No. 360,042, filed June 8, 1953, wherein foamed latex is used.

The resistance to compression of a cellular body, the cells in which are freely intercommunicating, is determined for a given density by the modulus of elasticity of the parent elastomeric substance of which the cell walls are composed. In the technology of solid rubber the modulus of elasticity of a compound can readily be varied (increased or decreased) by judicious compounding. Thus dry rubber, natural or synthetic, can be reinforced with finely divided materials like carbon black, fine particle clays, etc. until the modulus of the compound is many times that of the pure gum composition. An improvement in other physical properties like tensile strength, tear resistance and abrasion resistance frequently goes hand in hand with the improvement in modulus of elasticity. But a problem arises in that this technique of "reinforcement" is not at all applicable to latex. Moderate amounts of clay, hydrated alumina, etc. may succeed in stiffening latex compositions somewhat but they do so at a sacrifice of the properties of tensile strength, elongation at break and tear resistance. Also the stiffening effect is none too permanent and is partially lost through prolonged and repeated flexing.

Prior to the present improvements there have been proposals to increase the modulus of elasticity of cellular material produced from latex, without increasing its bulk density, by the uniform distribution of long resilient fibers throughout a body of the cellular rubber intended for cushioning use. This underlying idea has been described in U. S. Patent 2,159,213 to Howard and U. S. Patent 2,194,036 to J. A. Talalay. Such former proposals have contemplated forming a stereoreticulate skeleton mass of long curled upholstery fibers held to each other at their crossing points or points of close proximity by an elastomeric material, and space filling the interstices of such fibrous skeleton with an integral body of foam rubber. In this manner it has been proposed to make compressible resilient articles such as cushions in which a spot-bonded stereoreticulate structure of upholstery fibers and a cellular rubber made from foamed latex are co-existant throughout the cushioning body.

Because the latex foam rubber so used needs be of extremely light density and because the uniform permeation of a fibrous skeleton of rubberized hair with ready-made foam presents great difficulties, the freeze gelling method of making foam rubber set forth in U. S. Patent 2,432,353 to Talalay has been found to be particularly useful in the manufacture of foam rubber integrally reinforced with resilient fibers. This above mentioned freeze gelling method of generating and setting a foam contemplates enzymatic decomposition of hydrogen peroxide admixed with the latex to cause it to froth and then gelling the foam by first freezing it and subsequently causing its frozen perforate structure to be permeated with coagulating gas.

Thus these formerly proposed methods of making what may be termed "combination" material have entailed providing a spaciously intersticed network of curled upholstery fibers held to one another at points of proximity by an elastic binder, causing a dispersion of latex to extend itself by foaming expansion throughout the interstices of such fibrous network body, and then setting and finally vulcanizing the foam in the interstices.

One object of the present invention is to reinforce a cellular rubber cushioning body in a way to attain higher load carrying capacity in proportion to a very low weight factor or density in the finished product than heretofore has been accomplished.

A contributary object is to cause the fibrous component of a "combination" material, constituted as aforesaid, to be so disposed that a prependerance of the fibers as embedded in the foam rubber extend in concerted directions related more nearly perpendicular to than parallel with the load receiving or pressure bearing surfaces of a cushioning body of the combination material. Ordinarily the load bearing surface of a seat cushion of such material measuring, say, 24" in length by 24" in width by 5" in thickness would be either of the two 24" x 24" surfaces. These surfaces may be termed "broadside" faces of the finished cushion while the surfaces measuring 5" x 24" may be termed edge faces.

A related object of the invention is thereby to avail of the most effective resilience and greatest aggregate of load bearing strength of which the individual resilient fibers of the aforesaid fibrous skeleton are capable when called upon to support a load that is applied to a broadside surface of a cushioning body of the aforesaid combination material by arranging as many of the fibers as possible so as to bear their share of the load in columnar, as distinguished from beam-like or cantilever, manner of support.

A further object is to compensate for weakness that is inducive to side sway in a cushioning body constituted as described, and particularly by the use of stays placed in criss cross arrangement comprising mutually abutting separate strips, slabs or bars of the fibrous network of spot bonded fibers unified by an integral mass of latex foam extending throughout the cushioning body.

The foregoing and other objects of the invention are dealt with in greater particular in the following description of successful ways of practising our improved method having reference to the accompanying drawings wherein:

Fig. 1 shows the assembling of strips of an empty network of spot-bonded fibers or rubberized hair comprising one of the steps in our improved method.

Fig. 2 shows a mold partly broken away in which are packed the assembled dry strips of Fig. 5 whose combined interstices have now been filled throughout by a single continuous mass of foamed latex permanently converted into foam rubber within the mold.

Fig. 3 shows the spiked cover of the mold of Fig. 2 removed.

Fig. 4 represents component pieces of an empty rubberized hair network of modified shape and relative disposition ready to be assembled in a mold.

Fig. 5 shows the separate pieces of Fig. 4 assembled in criss-crossed, closely interfitting relation containable in a retaining mold of conforming cavity contour that otherwise may be like that of Fig. 1 so as to be unified by an undivided continuous mass of foam rubber extending throughout the interstices of all the assembled pieces thereby to form an integral cushioning body in accordance with the present invention.

So called curled upholstery fiber is commonly produced by blending a major proportion (60 to 85%) of a short stiff animal fiber, such as winter hog hair having say an average diameter of .0045" to .0055" and an average length of 1" to 1.25", with a lesser portion of "long" hair such as horse mane hair or cattletail hair. The long hair may range in length from 3" to 10" and be similar in diameter to the hog hair, although it contains frequently a proportion of "fines" or hair of lesser diameter. This blend of different kinds of hair is spun into a tight rope, exposed to wet heat and dried. When the rope is "unspun" or "untwisted" the individual fibers are found to possess a permanent and random curl.

So called rubberized hair, of which one well known brand is commercially termed "Hairlock," is usually produced on continuous sheet or bat forming apparatus, either by garnetting or by "shedding" or "spreading," curled animal hairs to form a loose dry bat, followed by spraying with an aqueous dispersion of an elastomer, and then drying, and vulcanizing.

In the process of so-called "shedding," the hair is carried over a metallic wire roll and brushed off this roll by a rapidly rotating wire brush cylinder. As a result, more or less individual curled hair filaments are projected through space and are made to come to rest on a horizontal traveling conveyor apron where they arrange themselves in more or less random distribution.

We have found that a directional distribution of the running lengths of the fibers can be obtained by the above method of "shedding" that is far from equal in the three perpendicularly related directions that may be designated respectively X, Y and Z. If X denotes the direction of the moving conveyor onto which the hair is shed, Y the horizontal direction across the same, and Z the vertical direction through the thickness of the sheet, it will be found that there will be a pronounced alignment of longitudinal fiber axes preferential to the horizontal directions X and Y at the expense of the vertical direction Z.

For example, we have found that when curled hair composed of 50% winter hog hair and 50% cattle-tail hair is "shed" onto a moving perforated conveyor and rubberized as above to produce a ratio of fiber to binder of approximately 1 to 1, a lightweight rubberized hair (.7 pound per cubic foot) will result which will have the following compressional characteristics:

| Direction in which load applied | Load Required to Compress to 75% of Original Dimension in Load Receiving Direction | Load Required to Compress to 50% of Original Dimension in Load Receiving Direction |
| --- | --- | --- |
| | P. s. i. | P. s. i. |
| "Broadside" (in the direction of Z-axis—mostly crosswise the lengths of the hairs). | .75 | 1.6 |
| "Edgewise" (in the direction of the X or Y axis—mostly in line with the lengths of the hairs). | 2.25 | 3.2 |

In other words the open framework of rubberized hair is about three times as stiff in the Z direction as compared with the X or Y directions for a 25% compression, and is twice as stiff in the Z direction as compared with the X or Y directions for a 50% compression.

We have discovered that this anisotropy in compressional resistance of the skeleton framework of rubberized hair can be carried over into the finished product composed of the hereinbefore referred to "combination material" or spot-bonded fibrous open work structure having its interstices fully occupied by an integral bulk of light-weight foam rubber.

The advantages in cushioning properties resulting from the specified manner of arrangement and use of the improved material above explained are newly availed of to great advantage according to the present improvements by assembling strips 12 of the dry empty open network of rubberized hair according to patterns of relative arrangement indicated in Fig. 1 that will add up to the total thickness and other overall dimensions of the finished article.

The strips 12 are cut from a dry bat or web of rubberized hair network while in empty spaciously intersticed skeleton form in which the curled hairs are spot bonded in stratified disposition as hereinbefore described. The strip surfaces 13 are the residium of a surface of the dry empty network that lie in the aforesaid bat-forming directions X or Y, while the strip surfaces 15 result from cutting in planes extending in the direction Z across the lengths of most of the fibers through the thickness of the original bat or web.

An assembly is pictured in Fig. 1 preferably is made by packing the dry strips 12 into a mold box 14 according to the criss cross pattern shown and in sufficient quantity to completely fill the mold box. After this the mold is closed and maintained closed by fastening down the cover 16 of the mold box and then a continuous unitary mass of light weight latex foam, preferably by the freeze gelling method hereinbefore identified, is caused to permeate and completely fill the interstices of the fibrous structure of all the assembled strips while the latter together with the latex are confined in the mold thus resulting in an integral cushioning body not composed of sections that are merely cemented together.

The mold box is refrigerated by a fluid coolant circulating through the conduit tubes 24 flanking the outer surfaces of the mold box 14 and its cover 16, while metallic spikes 26, depending from the cover pick up and transfer heat rapidly from the mold cavity and its contents to the refrigerating fluid circulating through the conduit.

This results in an integral cushioning body 18 of combination material having the broadside face 20 and comprising resilient cellular material 19 reinforced by combined network pieces of mutually intermingling resilient hairs or fibers embedded in the cellular material, the fibers of which body have a preponderance of their lengths oriented in concerted directions, namely up and down in Figs. 2, 4 and 5, or more nearly crosswise the broadside face 20 of the finished cushioning body 18 than parallel therewith. In consequence the cushioning body 18 while no heavier nor denser than cushioning bodies of the older styles of combination material is much more strongly resistive to compressive forces applied thereto in directions normal to its broadside surface.

Fig. 4 illustrates elongated pieces having modified shapes that may be cut from a bat or empty network of rubberized hair. The surfaces of these pieces that lie originally in the aforesaid bat-forming direction X or Y are designated 27 while the surfaces resulting from cutting across the lengths of most of the fibers through the thickness of the bat are designated 31. The caterpillar-shaped pieces 28 have notches 29 which are snugly fitted and filled by key-shaped pieces 30 so that the broken away assemblage of these pieces shown in Fig. 5 can be made while the interstices in the network of the pieces remain empty.

The assemblage shown in Fig. 5 can be made in a covered mold similar to that of Figs. 2 and 3, the cavity of the mold being modified to conform to the desired outer surface contours of the completed cushioning body.

We claim:

1. The method of making a cushioning body of minimum weight having optimum resistance to compression by loads applied against a broadside face of said body, which includes the steps of, loosely assembling long curly resilient fibers into a dry spaciously intersticed bat in sufficiently stratified relationship to dispose the lengths of a preponderance of said fibers more nearly in alignment with reference planes parallelling one face of said bat than in crosswise relation to said reference planes whereby a stratum of said fibers is presented at said face of the bat, coating all of the fibers in the bat while in said relationship with an elastomer of sufficient quantity to spot-bond said fibers to one another at points only of mutual contact and close proximity but of insufficient quantity to clog said interstices of the bat, setting said elastomer to fix said loosely formed bat into a resilient compressible fibrous skeleton network of said spot bonded fibers, placing together separate elongate pieces of said network in mutually crossing interabutting relation to form an assemblage in the shape of a cushioning body having a broadside load-bearing face lying crosswise said reference planes, causing a dispersion of latex to extend itself continuously between said spot bonded fibers of all of said pieces of said network by sufficient foaming expansion completely to fill the interstices thereof with a continuous single mass of the latex foam, and permanently setting said latex foam into an integral body of foam rubber unifying said separate lengths of fibrous network into an integral cushioning body in which the lengths of a preponderance of the fibers of the unified separate pieces of bonded fibrous network are disposed more nearly perpendicular to than parallel with said broadside load bearing face of the cushioning body.

2. The method of making a cushioning body of minimum weight having optimum resistance to compression by loads applied against a broadside face of said body, which includes the steps of, loosely assembling long curly resilient fibers into a dry spaciously intersticed bat in sufficiently stratified relationship to dispose the lengths of a preponderance of said fibers more nearly in alignment with reference planes parallelling one face of said bat than in crosswise relation to said reference planes, whereby a stratum of said fibers is presented at said face of the bat, coating all of the fibers in the bat while in said relationship with an elastomer of sufficient quantity to spot-bond said fibers to one another at points only of mutual contact and close proximity but of insufficient quantity to clog said interstices of the bat, setting said elastomer to fix said loosely formed bat into a resilient compressible fibrous skeleton network of said spot bonded fibers, placing together separate elongate pieces of said network in interabutting relation to form an assemblage in the shape of a cushioning body having a broadside load-bearing face lying crosswise said reference planes, causing a dispersion of latex to extend itself continuously between said spot bonded fibers of all of said pieces of said network by sufficient foaming expansion completely to fill the interstices thereof with a continuous single mass of the latex foam, and permanently setting said latex foam into an integral body of foam rubber unifying said separate lengths of fibrous network into an integral cushioning body in which the lengths of a preponderance of the fibers of the unified separate pieces of bonded fibrous network are disposed more nearly perpendicular to than parallel with said broadside load bearing face of the cushioning body.

3. The method of making a cushioning body as defined in claim 2, in which the said elongate pieces of network are die cut from a relatively thin web of like network in which web the lengths of a preponderance of the said fibers are more nearly parallel with than perpendicular to the broad surface of said web.

4. The method of making a cushioning body as defined in claim 2, in which the said assemblage of elongate pieces of network are confined in the presence of the said dispersion of latex within a mold cavity of shape and size conforming to the outer contours of said assemblage before said dispersion extends itself to fill the interstices of said network.

5. The method of making a cushioning body as defined in claim 4, in which the said cavity contained network and the said expanding dispersion of latex are penetrated by heat transferring spikes projecting into the said mold cavity from the surrounding walls of the mold.

References Cited in the file of this patent

UNITED STATES PATENTS

| Number | Name | Date |
|---|---|---|
| 725,821 | Berr | Apr. 21, 1903 |
| 1,998,807 | Galvan | Apr. 23, 1935 |
| 2,080,886 | Fowler | May 18, 1937 |
| 2,172,767 | Levine et al. | Sept. 12, 1939 |
| 2,341,130 | Unsworth | Feb. 8, 1944 |
| 2,546,230 | Modigliani | Mar. 27, 1951 |
| 2,552,124 | Tallman | May 8, 1951 |
| 2,580,202 | Talalay et al. | Dec. 25, 1951 |
| 2,649,900 | Pfankuch | Aug. 25, 1953 |

FOREIGN PATENTS

| Number | Country | Date |
|---|---|---|
| 448,122 | Great Britain | June 2, 1936 |